United States Patent
Dinc et al.

(10) Patent No.: US 12,407,551 B2
(45) Date of Patent: Sep. 2, 2025

(54) BIDIRECTIONAL DATA TRANSMISSION OVER ISOLATION MEDIUM

(71) Applicant: TEXAS INSTRUMENTS INCORPORATED, Dallas, TX (US)

(72) Inventors: Tolga Dinc, Dallas, TX (US); Swaminathan Sankaran, Allen, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 50 days.

(21) Appl. No.: 18/341,482

(22) Filed: Jun. 26, 2023

(65) Prior Publication Data
US 2024/0430147 A1    Dec. 26, 2024

(51) Int. Cl.
*H04L 5/14* (2006.01)
*H04L 27/20* (2006.01)
*H04L 27/36* (2006.01)

(52) U.S. Cl.
CPC ............ *H04L 27/2071* (2013.01); *H04L 5/14* (2013.01); *H04L 5/1415* (2013.01); *H04L 5/143* (2013.01); *H04L 27/362* (2013.01)

(58) Field of Classification Search
CPC .............. H04B 10/556; H04B 10/5561; H04B 10/5563; H04B 14/06; H04L 5/14; H04L 5/1415; H04L 5/143; H04L 27/20; H04L 27/2071; H04L 27/22; H04L 27/36; H04L 27/362; H04L 27/38
See application file for complete search history.

(56) References Cited

U.S. PATENT DOCUMENTS

| | | | |
|---|---|---|---|
| 4,563,653 A * | 1/1986 | Perahia | H03G 1/0023 |
| 9,088,471 B1* | 7/2015 | Kim | H04L 27/2071 |
| 11,405,042 B2 | 8/2022 | Finocchiaro et al. | |
| 2008/0014896 A1* | 1/2008 | Zhuo | H03D 7/166 |
| | | | 455/326 |
| 2011/0124306 A1* | 5/2011 | Litmanen | H03G 1/0029 |
| | | | 455/127.2 |
| 2016/0134460 A1* | 5/2016 | Lee | H04L 27/362 |
| | | | 375/261 |
| 2019/0305397 A1* | 10/2019 | Dinc | H04L 5/14 |

* cited by examiner

*Primary Examiner* — Levi Gannon
(74) *Attorney, Agent, or Firm* — Frank D. Cimino

(57) ABSTRACT

An apparatus includes a controller having differential modulation control outputs and is configured to provide differential modulation signals having a particular frequency at the differential modulation control outputs. A differential modulator circuit is coupled between first differential terminals and second differential terminals. The differential modulator circuit has differential modulation control inputs coupled to the differential modulation control outputs. The differential modulator circuit is configured to: modulate first differential signals at the first differential terminals with the differential modulation signals having the particular frequency, provide the modulated first differential signals at the second differential terminals, modulate second differential signals at the second differential terminals with the differential modulation signals having the particular frequency, and provide the modulated second differential signals at the first differential terminals.

21 Claims, 10 Drawing Sheets

BIDIRECTIONAL DATA TRANSMISSION OVER ISOLATION MEDIUM

BACKGROUND

In some applications, two devices with different voltage domains may need to communicate with each other via various medium and protocols. For example, two devices may be connected via a cable, a pair of connectors, or other types of medium, and communicate by transmitting data signals according to a protocol, such as Universal Serial Bus (USB) protocol, BASE100/1000-T1 Ethernet protocols, Data Over Cable Service Interface Specification (DOCSIS), etc., over the medium. For some applications, it may be desirable to interpose an isolation device between the two devices to provide galvanic isolation. Galvanic isolation can prevent a flow of direct current (DC) signal or low frequency signal between the two devices, which can mitigate potential circuit damage and safety hazard caused by such signals. However, the isolation medium may complicate the ability of the systems in performing bidirectional data transmission over the isolation medium and processing of the received data.

SUMMARY

In one example, an apparatus includes a controller having differential modulation control outputs and is configured to provide differential modulation signals having a particular frequency at the differential modulation control outputs. A differential modulator circuit is coupled between first differential terminals and second differential terminals. The differential modulator circuit has differential modulation control inputs coupled to the differential modulation control outputs. The differential modulator circuit is configured to: modulate first differential signals at the first differential terminals with the differential modulation signals having the particular frequency, provide the modulated first differential signals at the second differential terminals, modulate second differential signals at the second differential terminals with the differential modulation signals having the particular frequency, and provide the modulated second differential signals at the first differential terminals.

In another example, an apparatus includes a first controller having first differential modulation control outputs and is configured to provide first differential modulation signals having a particular frequency at the first differential modulation control outputs. A first differential modulator circuit is coupled between first differential terminals and second differential terminals. The first differential modulator circuit has first differential modulation control inputs coupled to the first differential modulation control outputs. The first differential modulator circuit configured to: modulate first differential signals at the first differential terminals with the first differential modulation signals having the particular frequency, provide the modulated first differential signals at the second differential terminals, modulate modulated second differential signals at the second differential terminals with the first differential modulation signals having the particular frequency to recover second differential signals, and provide the recovered second differential signals at the first differential terminals. A second controller has second differential modulation control outputs and is configured to provide second differential modulation signals having the particular frequency at the second differential modulation control outputs. A second differential modulator circuit is coupled between third differential terminals and fourth differential terminals. The second differential modulator circuit has second differential modulation control inputs coupled to the second differential modulation control outputs. The second differential modulator circuit is configured to modulate the modulated first differential signals at the third differential terminals with the second differential modulation signals having the particular frequency to recover the first differential signals, provide the recovered first differential signals at the fourth differential terminals, modulate second differential signals at the fourth differential terminals with the second differential modulation signals having the particular frequency, and provide the modulated second differential signals at the third differential terminals.

In yet another example, an apparatus includes a controller having a modulation control output and is configured to provide a modulation signal having a particular frequency at the modulation control output. A modulator circuit is coupled between a first terminal and a second terminal. The modulator circuit has a modulation control input coupled to the modulation control output. The modulator circuit is configured to: modulate a first signal at the first terminal with the modulation signal having the particular frequency; provide the modulated first signal at the second terminal; modulate a second signal at the second terminal with the modulation signal having the particular frequency, and provide the modulated second signal at the first terminal.

DETAILED DESCRIPTION

Figure 1:
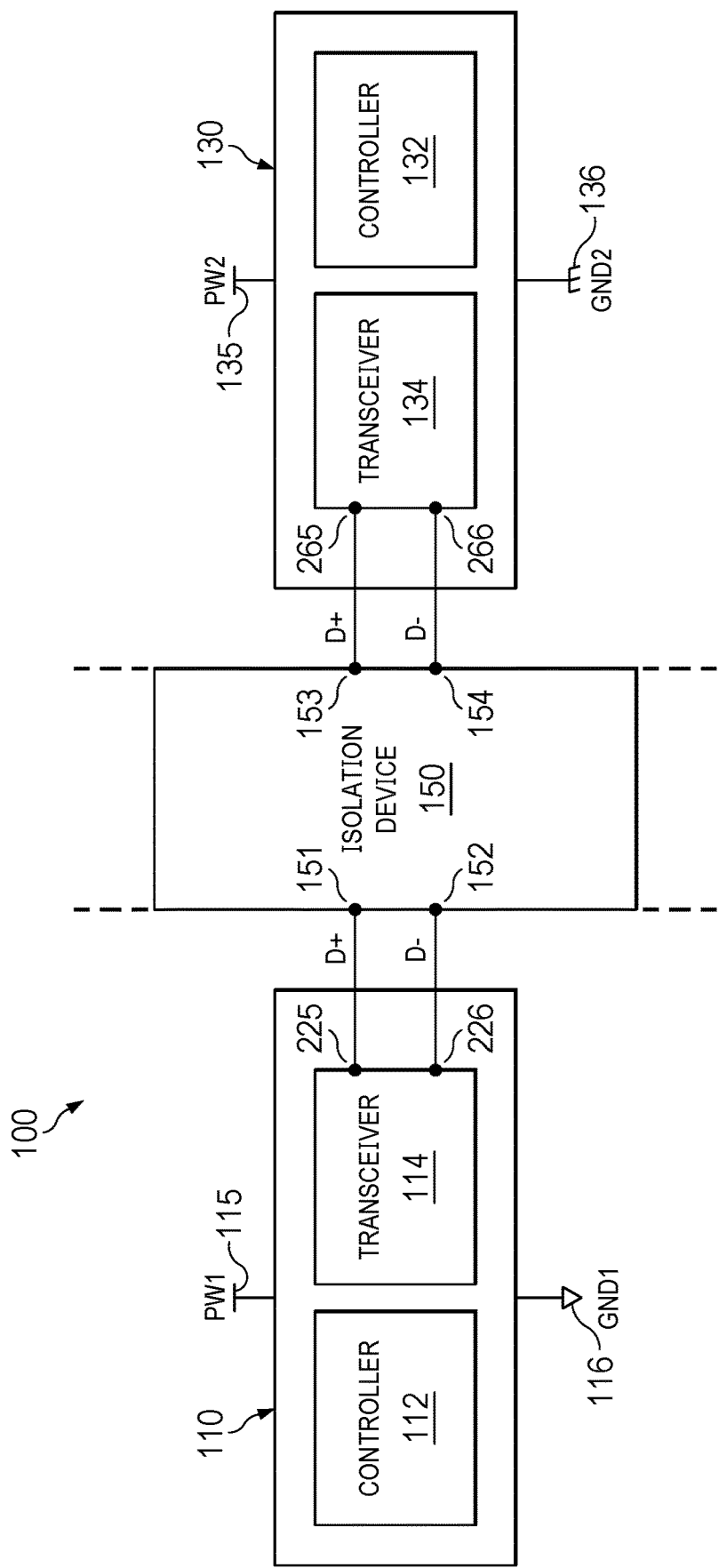
FIG. 1 is a schematic diagram of a system that supports bidirectional data communication over an isolation device, in accordance with various examples.

The same reference numbers or other reference designators are used in the drawings to designate the same or similar (either by function and/or structure) features.

FIG. 1 is a schematic diagram of a system 100 that supports bidirectional data communication over an isolation device, in accordance with various examples. System 100 includes a first device 110 and a second device 130, and an isolation device 150 coupled between the first device 110 and the second device 130. Isolation device 150 can provide galvanic isolation between the first device 110 and the second device 130. The first device 110 can include a controller 112 and a transceiver 114. First device 110 can operate in a first power/voltage domain, for which first device 110 has a power supply terminal 115 that receives a supply voltage PW1, and a supply reference terminal 116 coupled to a first ground GND1. Also, second device 130 can include a controller 132 and a transceiver 134. Second device 130 can operate in a second power/voltage domain, for which second device 130 has a power supply terminal 135 that receives a supply voltage PW2, and a supply reference terminal 136 coupled to a second ground GND2. The supply voltage PW1 with respect its ground GND1 can be the same or different voltage than the supply voltage PW2 with respect to its ground GND2. In some examples, supply voltage PW1 can be 5-20V DC and supply voltage PW2 can be 1 kV DC.

Isolation device 150 can provide galvanic isolation between power supply terminals 115 and 135, and between first ground GND1 and second ground GND2. Isolation device 150 can have a band pass characteristic, and can prevent (or at least reduce) the flow of DC/low frequency current and/or voltage signals outside the pass frequency band of isolation device 150. Isolation device 150 can include a transformer and can prevent flow of DC/low frequency current and/or voltage signals between power supply terminals 115 and 135, and between first ground GND1 and second ground GND2. Such arrangements can prevent or mitigate potential circuit damage and safety hazard caused by such signals. For example, first device 110 may be a consumer electronic device handled by a person and can tolerate only a low supply voltage PW1 (e.g., 5-20V DC), and second device 110 may be an industrial sensor operating with a high supply voltage PW2 (e.g., 1 kV DC). Isolation device 150 can prevent a large voltage signal and/or a large current signal from propagating from supply reference terminal 135 to supply reference terminal 115, and/or from supply reference terminal 136 to supply reference terminal 116, which may otherwise damage first device 110 and/or pose safety hazard to the person handling first device 110.

Also, transceiver 114 of the first device 110 can include differential terminals 225 and 226 on which transceiver 114 can transmit or receive differential signals D+/D−, respectively. Differential terminals 225 and 226 can be coupled to corresponding differential terminals 151 and 152 of isolation device 150. Transceiver 134 of the second device 130 can include differential terminals 265 and 266 on which transceiver 134 can transmit or receive differential signals D+/D− respectively. Differential terminals 265 and 266 can be coupled to corresponding differential terminals 153 and 153 of isolation device 150. Each of transceiver 114 and 134 can include a differential receiver that extract the information represented by the differential signals D+/D− by subtracting between D+ and D−.

The differential signals are alternating current (AC) signals having a relatively high frequency component and can be within the pass frequency band of isolation device 150, so that isolation device 150 can transmit the differential signals between first device 110 and second device 130 with no or reduced attenuation. On the other hand, isolation device 150 can prevent the transmission of low frequency component of the differential signals, such as the common mode or bias voltage of the differential signals. But because the differential receiver in each of transceiver 114 and 134 extract the information represented by the differential signals D+/D− by subtracting between D+ and D−, the common mode component of D+ and D− is largely absent in the extracted information, and the removal of the DC or low frequency common mode component from D+ and D− by isolation device 150 does not affect the information extraction.

In some examples, to facilitate transmission of the differential signals via isolation device 150, each of devices 110 and 130 can perform a modulation operation on the differential signals, and transmit the modulated differential signals via isolation device. For example, first device 110 can modulate first differential signals to be transmitted using a first modulation signal having a particular frequency, and transmit the modulated first differential signals to differential terminals 225 and 256 (and differential terminals 151 and 152). Isolation device 150 can receive the modulated first differential signals at differential terminals 151 and 152, and transmit the modulated first differential signals to differential terminals 153 and 154 (and differential terminals 265 and 266). Second device 130 can receive the modulated first differential signals at differential terminals 265 and 266, and modulate the modulated first differential signals using a second modulation signal (as part of a demodulation operation) having the particular frequency to recover the first differential signals.

Also, second device 130 can modulate second differential signals to be transmitted using the second modulation signal, and transmit the modulated second differential signals to differential terminals 265 and 256 (and differential terminals 153 and 154). Isolation device 150 can receive the modulated second differential signals at differential terminals 153 and 154, and transmit the modulated second differential signals to differential terminals 151 and 152 (and differential terminals 225 and 226). First device 110 can receive the modulated second differential signals at differential terminals 225 and 226, and modulate the modulated second differential signals using the first modulation signal (as part of a demodulation operation) to recover the second differential signals.

The modulation operation can shift the first/second differential signals from a first frequency band to a second frequency band, where the second frequency band has a reduced ratio between the maximum and minimum frequencies compared with the first frequency band. Isolation device 150 can have a pass frequency band that matches or includes the second frequency band. Such arrangements can relax the transformer design of isolation device 150 by reducing the maximum and minimum frequencies of the pass frequency band of isolation device 150, and allow transmission of the differential signals with no or reduced attenuation via isolation device 150 having such pass band characteristics. Specifically, a transformer designed for higher frequency operation can require smaller primary/secondary coil inductance values, which can be achieved with a smaller number of turns of each coil. A transformer with fewer turns of the primary and second coils is smaller than a transformer with more turns, all else being equal. Further, a transformer with fewer turns of the primary and secondary coils can be implemented with a higher quality factor and at a lower cost.

Also, the modulation and demodulation operation can be largely agnostic to the signaling protocol and bidirectional transmission mode of the differential signals, so long as the frequency band of the modulated signal is within the pass frequency band of isolation device 150. Accordingly, differential signals of various protocols (e.g., USB, BASE100/1000-T1 Ethernet, DOCSIC, etc.) and of various bidirectional transmission modes (e.g., full duplex and half duplex) can be modulated for transmission over isolation device 150 and demodulated to recover the differential signals.

Figure 2:
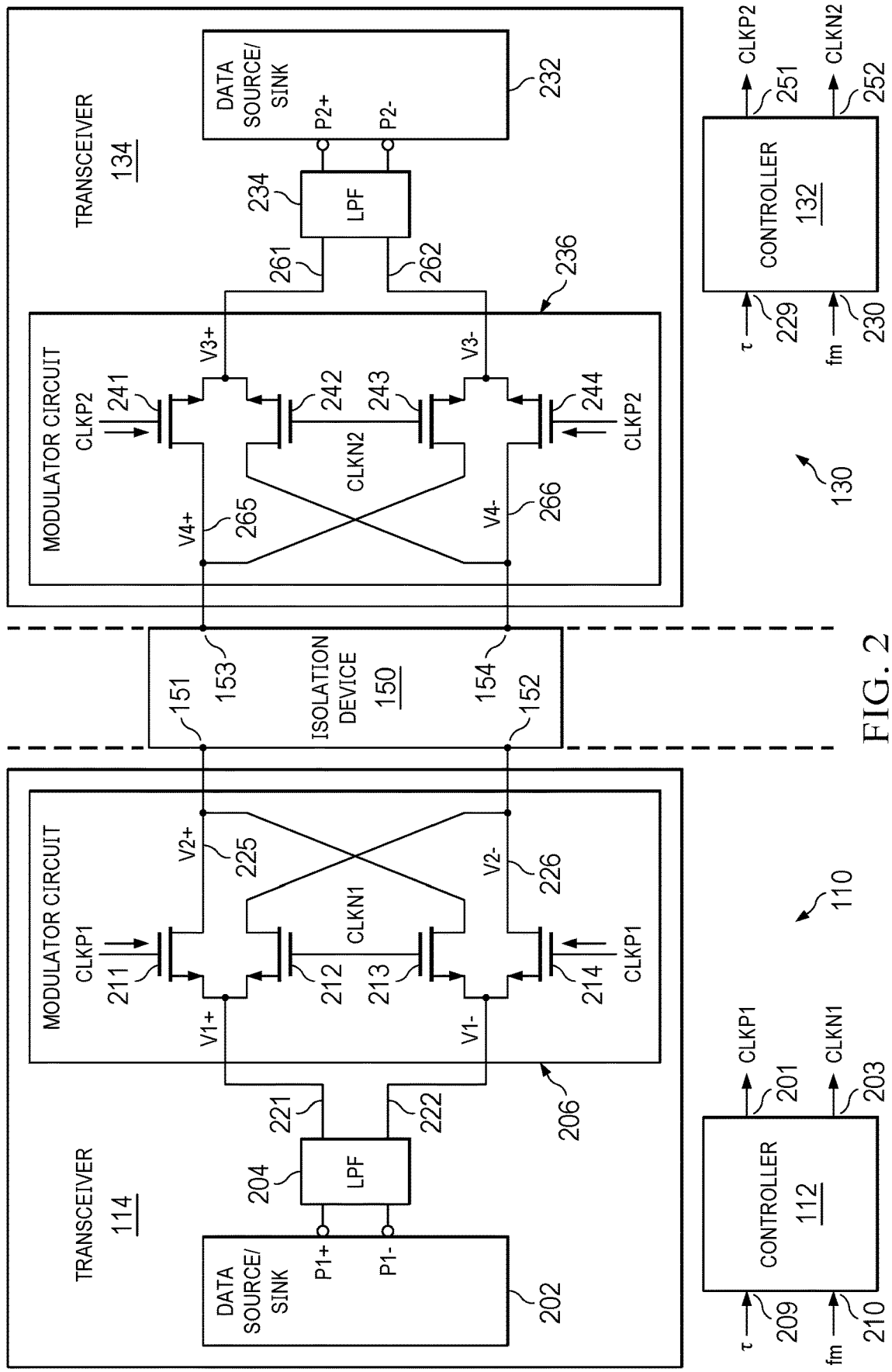
FIG. 2 is a schematic diagram of internal components of FIG. 1 to support bidirectional data communication over an isolation medium, in accordance with various examples.

FIG. 2 is a schematic diagram illustrating internal components of system 100 in accordance with various examples. In the example illustrated in FIG. 2, transceiver 114 can include a data source/sink 202, a low pass filter (LPF) 204, and a modulation circuit 206. In another example, data source/sink 202 is external to the transceiver 114. Low pass filter 204 is coupled between data source/sink 202 and modulation circuit 206. Low pass filter 204 has differential filter terminals 221 and 222. Modulation circuit 206 can include transistors 211, 212, 213, and 214. In some examples, transistors 211-214 can each include High Electron Mobility Transistors (HEMTs). Differential filter terminal 221 of low pass filter 204 can be coupled to first current terminals (e.g., sources) of transistors 211 and 212. Differential filter terminal 222 can be coupled to first current terminals (e.g., sources) of transistors 213 and 214. Second current terminals (e.g., drains) of transistors 211 and 213 can be coupled to the differential terminal 225, and second current terminals (e.g., drains) of transistors 212 and 214 can be coupled to the differential terminal 226.

Also, controller 112 has control inputs 209 and 210 and differential modulation control outputs 201 and 203. Differential modulation control output 201 can be coupled to the gates of transistors 211 and 214, and differential modulation control output 203 can be coupled to the gates of transistors 212 and 213. Controller 112 generates differential modulation signals CLKP1 and CLKN1 at differential modulation control outputs 201 and 203 as shown. The differential modulation signals CLKP1/CLKN1 can have different polarities and each has a frequency $f_m$ and a cycle period $T_m$ ($T_m$ is $1/f_m$) programmed according to a signal at control input 210. CLKN1 is 180 degrees out of phase with respect to CLKP1. When CLKP1 is logic high and CLKN1 is logic low, transistors 211 and 214 are on and transistors 212 and 213 are off, and when CLKP1 is logic low and CLKN1 is logic high, transistors 211 and 214 are off and transistors 212 and 213 are on.

Also, transceiver 134 can include a data source/sink 232, an LPF 234, and a modulation circuit 236. In another example, data source/sink 232 is external to the transceiver 134. Low pass filter 234 is coupled between data source/sink 232 and modulation circuit 236. Low pass filter 234 has differential filter terminals 261 and 262. Modulation circuit 236 can include transistors 241, 242, 243, and 244. Transistors 241-244 can be FETs/HEMTs. Differential filter terminal 261 can be coupled to the first current terminals (e.g., sources) of transistors 241 and 242. Differential filter terminal 262 can be coupled to the first current terminals (e.g., sources) of transistors 243 and 244. Second current terminals (e.g., drains) of transistors 241 and 243 can be coupled to the differential terminal 265, and the second current terminals (e.g., drains) of transistors 242 and 244 can be coupled to the differential terminal 266. Controller 132 has a control input 229, a control input 230, and differential modulation control outputs 251 and 252. Differential modulation control output 251 can be coupled to the gates of transistors 241 and 244, and differential modulation control output 252 can be coupled to the gates of transistors 242 and 243. Controller 132 generates differential modulation signals CLKP2 and CLKN2 at its differential modulation control outputs 251 and 252 as shown. The differential modulation signals CLKP2/CLKN2 can have different polarities and each has the same frequency $f_m$ and the same cycle period $T_m$ ($T_m$ is $1/f_m$) as CLKP1/CLKN1 and can be programmed according to a signal at control input 230. CLKN2 is 180 degrees out of phase with respect to CLKP2. When CLKP2 is logic high and CLKN2 is logic low, transistors 241 and 244 are on and transistors 242 and 243 are off, and when CLKP2 is logic low and CLKN2 is logic high, transistors 241 and 244 are off and transistors 242 and 243 are on.

In one example operation, data source/sink 202 can generate differential signals P1+/P1−, which is provided to LP 204. LPF 204 filters differential signal P1+/P1− and provides filtered differential signals V1+ and V1− to the modulation circuit 206. Modulation circuit 206 modulates the filtered differential signals V1+/V1− using differential modulation signals CLKP1/CLKN1 to produce modulated differential signals V2+/V2−. The frequency of the differential modulation signals CLKP1/CLKN1 produced by controller 112 is higher than the frequency of the baseband filtered differential signal V1+/V1−. In one example, the frequency of the differential modulation signals CLKP1/CLKN1 is n-times higher than the frequency of the filtered differential signals V1+/V1−, where n can be 2, 3, 4, 5, 6, 7, 8, etc.

Modulated differential signals V2+/V2− are provided to differential terminals 151 and 152 of isolation device 150. Isolation device 150 transmit the modulated differential signal V2+/V2− from differential terminals 151/152 to differential terminals 153/154 as modulated differential signals V4+/V4−, and thus to differential terminals 265/266 of modulation circuit 236. Modulation circuit 236 mixes the modulated differential signals V4+/V4− with differential modulation signal CLKP2/CLKN2 from controller 132 to produce differential signals V3+/V3− as part of a demodulation operation. LPF 234 low pass filters differential signals V3+/V3− to recover differential signal P2+P2−, which is provided to data source/sink 232.

Also, in one example operation, data source/sink 232 can generate differential signals P2+/P2−, which can be provided to LP 234. LPF 234 filters differential signal P2+/P2− and provides filtered differential signal V3+/V3− to the modulation circuit 236. Modulation circuit 236 modulates the differential signals V3+/V3− using differential modulation signals CLKP2/CLKN2 to produce modulated differential signals V4+/V4−. The frequency of differential modulation signals CLKP2/CLKN2 is identical to differential modulation signals CLKP1/CLKN1 provided to modulation circuit 206 and is higher than the frequency of the filtered differential signals V3+/V3−. Modulated differential signals V4+/V4− are provided to differential terminals 153 and 153 of isolation device 150, which transmits the modulated differential signal V4+/V4− from differential terminals 153/154 to differential terminals 151/152 as modulated differential signals V2+/V2−, and thus to differential terminals 225/226 of modulation circuit 206. Modulation circuit 206 mixes the modulated differential signal V2+/V2− with differential modulation signals CLKP1/CLKN1 from controller 132 as part of a demodulation operation to produce differential signal V1+/V1−. LPF 204 low pass filters differential signal V1+/V1− to recover differential signals P1+/P1−, which are provided to data source/sink 202.

As described above, the frequency of the differential modulation signals CLKP1/CLKN1 and CLKP2/CLKN2 can be the same. However, to account for the propagation delay ($\tau_f$) through isolation device 150, one of the controllers 112, 132 imposes a delay, $\tau$, in its differential modulation signal with respect to the other controller's differential modulation signals. For relatively low loss operation through isolation device 150, the delay value t, the propagation delay $\tau_f$, and a function m(t) representing the differential modulation signals (CLKP1/CLKN1 and CLKP2/CLKN2) can be related as follows:

$$\text{Abs}(m(t - \tau_f) * m(t - \tau)) = 1 \qquad \text{(Eq. 1)}$$

$$\text{Abs}(m(t - \tau - \tau_f) * m(t)) = 1 \qquad \text{(Eq. 2)}$$

In some examples, the delay value t, the propagation delay $\tau_f$, and the cycle period of the differential modulation signals modulation signal $T_m$ can be related as follows to satisfy the conditions of Equations 1 and 2 above:

$$\tau = \tau_f + l\left(\frac{T_m}{2}\right) \qquad \text{(Eq. 3)}$$

$$\tau_f = k\left(\frac{T_m}{4}\right) \qquad \text{(Eq. 4)}$$

In Equations 3 and 4, k can include any non-zero integer, and l can include an integer including zero. As an example, in a case where the frequency of the modulation signal equals 8 GHZ, the propagation delay $\tau_f$ of isolation device 150 can be 31.25 picoseconds (ps). Either of the controllers 112 and 132 can be programmed with the delay τ through the respective control input 209 or 229 (e.g., by programming a register internal to the controller).

Figure 3:
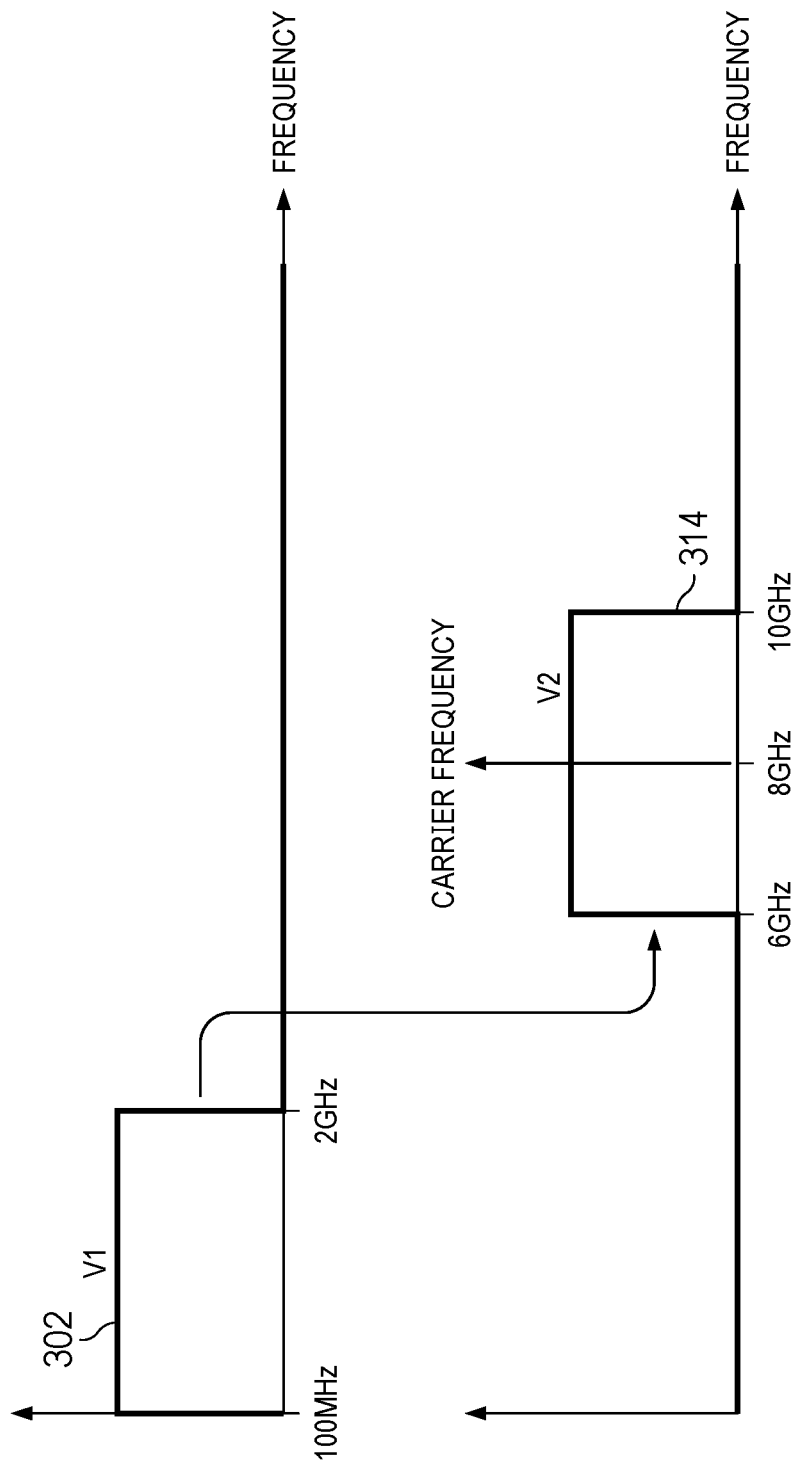
FIG. 3 are graphs illustrating operations of the internal components of FIG. 1 in frequency domain, in accordance with various examples.

FIG. 3 includes graphs 302 and 314 that illustrate an example modulation operation in frequency domain. Frequency graph 302 illustrate example differentials signals V1+/V1– (V1 in FIG. 3) in frequency domain. In this example, the frequency band of the differential signals V1 is 100 MHz to 2 GHz, where the ratio between the maximum frequency and the minimum frequency of the frequency band is 20.

Frequency graph 314 illustrates example modulated differential signals V2+/V2– (V2 in FIG. 3) provided by modulation circuit 206 by modulating differentials signals V1+/V1– using differential modulation signals CLKP1/CLKN1 having a frequency of 8 GHz. Because of the modulation, the frequency band of modulated differential signals V2+/V2– is 6 GHz and 10 GHZ, where a ratio between the maximum frequency and the minimum frequency of the frequency band is 1.67. As explained above, the reduced ratio can relax the transformer design of isolation device 150.

Figure 4:
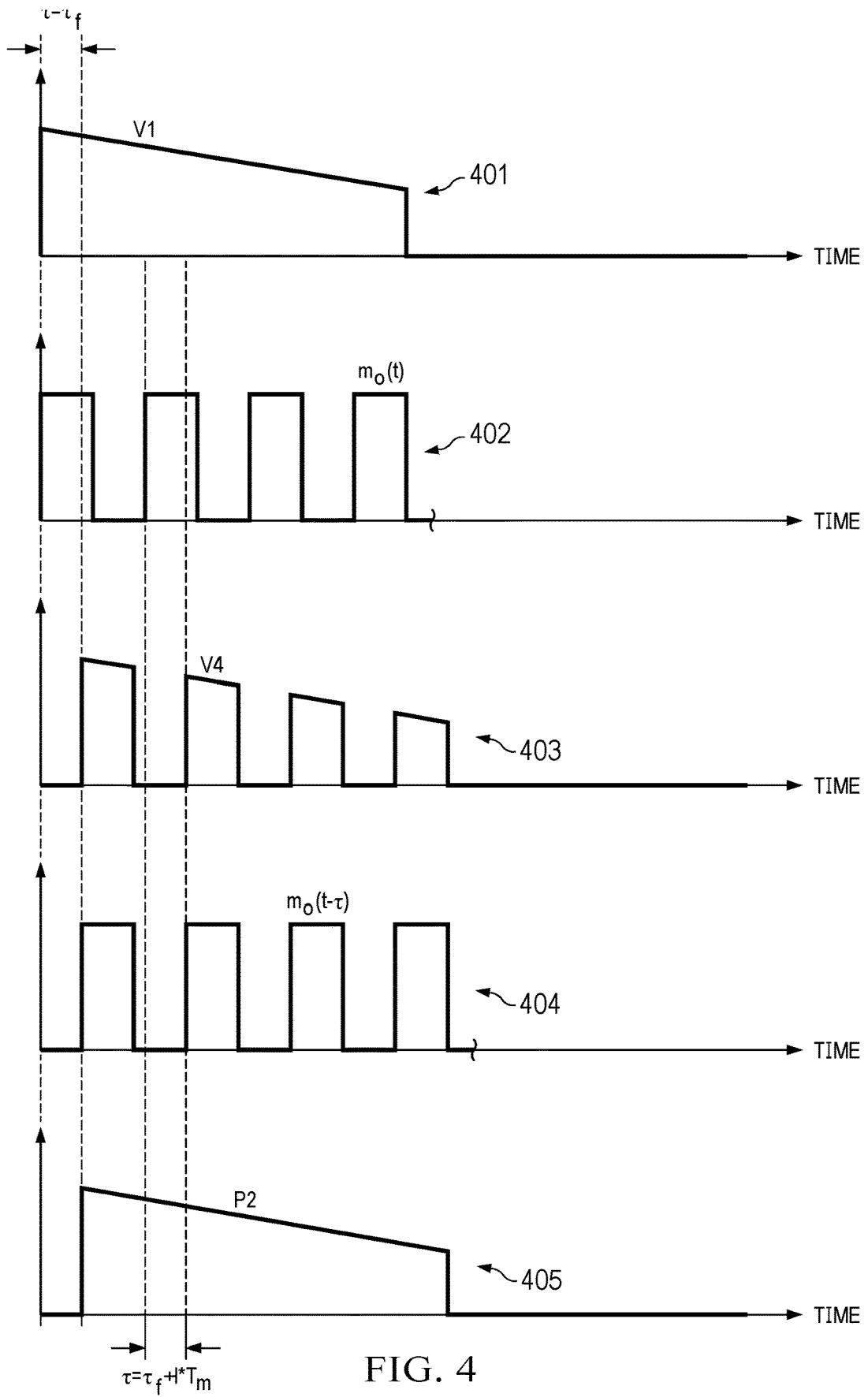
FIG. 4 are graphs illustrating operations of the internal components of FIG. 1 in time domain, in accordance with various examples.

FIG. 4 include graphs 401, 402, 403, 404, and 405 that illustrate example operations of modulator circuit 206, isolation device 150, and modulator circuit 236 in time domain. Graph 401 illustrates an example of differential signals V1+/V1– (labelled as V1 in FIG. 4) provided by data source/sink 202 and transmitted by transceiver 114. Graph 402 illustrates an example of differential modulation signals CLKN1/CLKP1 (labelled as $m_0(t)$ in FIG. 4). Graph 403 illustrates example differentials signals V4+/V4– (labelled as V4 in FIG. 4) that are delayed from V1 by propagation delay $\tau_f$ of isolation device 150. Graph 404 illustrates example differential modulation signals CLKN2/CLKP2 that are phase shifted/delayed by the delay value τ (labelled as $m_0(t-\tau)$ in FIG. 4). Further, graph 405 illustrates example differential signals P2+/P2– (labelled as P2 in FIG. 4) obtained by mixing V4 with $m_0(t-\tau)$ as part of a demodulation operation, followed by low pass filtering by LPF 234. One of the controllers (e.g., controller 132) implements the delay τ for the modulation signal m(t) of waveform 404 relative to the modulation signal m(t) of waveform 402.

Figure 5:
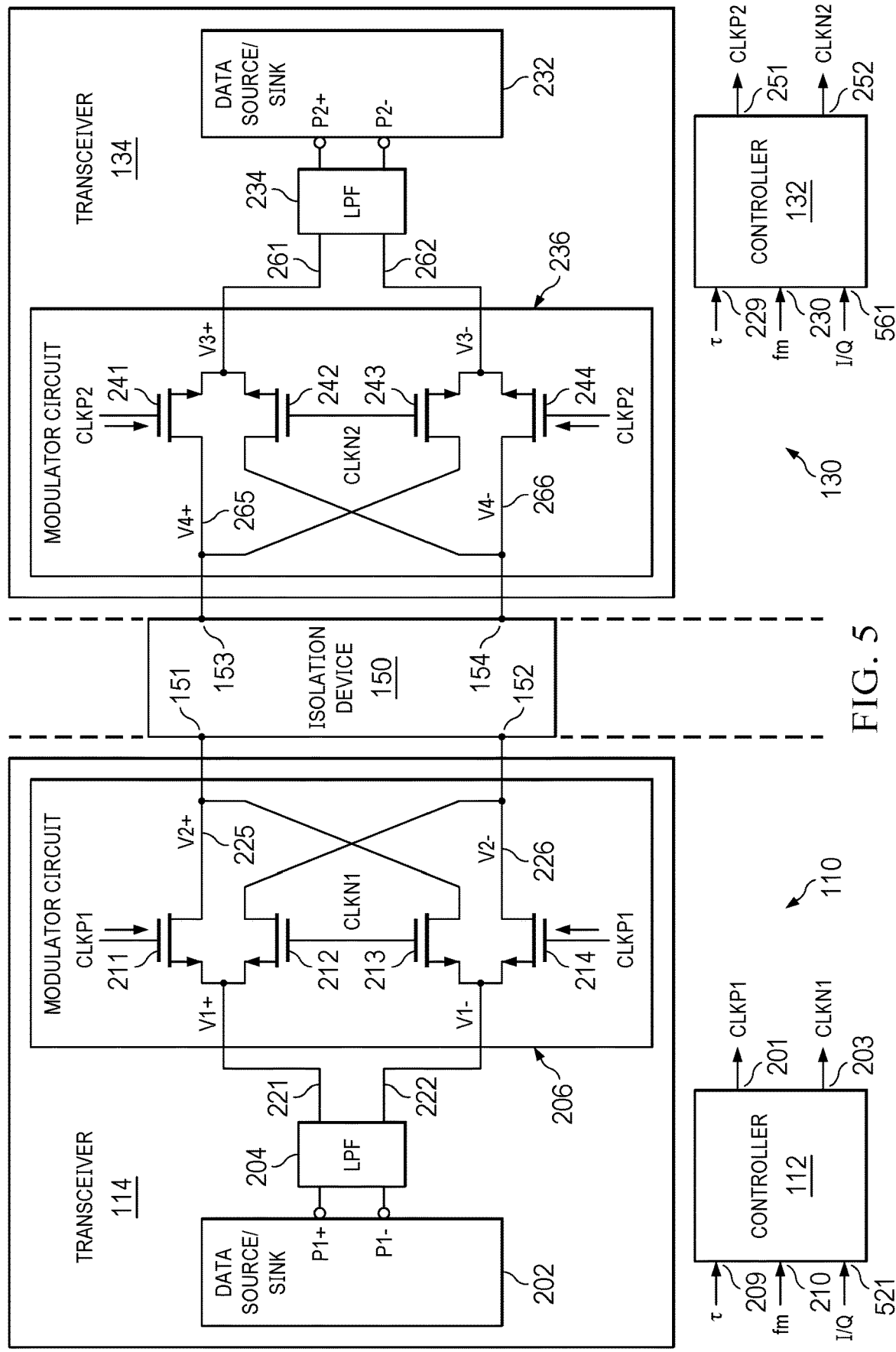
FIGS. 5, 6, 7, 8, and 9 are schematic diagrams of internal components of FIG. 1 to support bidirectional data communication over an isolation medium, in accordance with various examples.

FIG. 5 is a schematic diagram of internal components of system 100 in accordance with various examples. As described above, either controller 112 or 132 can implement the delay τ (as programmed through the corresponding control input 209 or 229) for its differential modulation signal CLKP/CLKN relative to the other controller's differential modulation signal. Each controller 112 and 132 in the example of FIG. 5 can generate differential quadrature (in-phase (I) and quadrature (Q)) modulation signals for CLKP/CLKN. The quadrature modulation signals can include $m_0(t)$, $m_{90}(t)$, $m_{180}(t)$, and $m_{270}(t)$, where the subscripts 0, 90, 180, and 270 refer to the four clock phases 0 degrees, 90 degrees, 180, degrees, and 270 degrees.

Controller 112 has an I/Q control input 521, and controller 132 has an I/Q control input 561. In one example, a logic high on an I/Q control input 521 or 561 causes the corresponding controller to select the I modulation signal phases ($m_0(t)$ and $m_{180}(t)$) as its differential modulation signal CLKP/CLKN, and a logic low on an I/Q control input 521 or 561 causes that controller to select the Q modulation signal phases ($m_{90}(t)$ and $m_{270}(t)$) as its differential modulation signal CLKP/CLKN. The I/Q control inputs 521/561 of controllers 112/132 can be programmed such that the I phase for the modulation signals of one of the controllers is selected and the Q phase for the other controller is selected.

If the I/Q control input 521 for controller 112 is programmed for the I phase and the I/Q control input 561 for controller 132 is programmed for the Q phase, controller 112 can generate CLKP1 to have phase $m_0(t)$ and CLKN1 to have phase $m_{180}(t)$ (the I phase), and controller 132 can generate CLKP2 to have phase $m_{90}(t-\tau)$ and CLKN2 to have phase $m_{270}(t-\tau)$ (the Q phase). In this configuration, controller 132 implements the delay t.

If the I/Q control input 521 for controller 112 is programmed for the Q phase and the I/Q control input 561 for controller 132 is programmed for the I phase, controller 132 can generate CLKP2 to have phase $m_0(t)$ and CLKN2 to have phase $m_{180}(t)$ (the I phase), and controller 112 can generate CLKP1 to have phase $m_{90}(t-\tau)$ and CLKN1 to have phase $m_{270}(t-\tau)$ (the Q phase). In this configuration, controller 112 implements the delay t.

Figure 6:
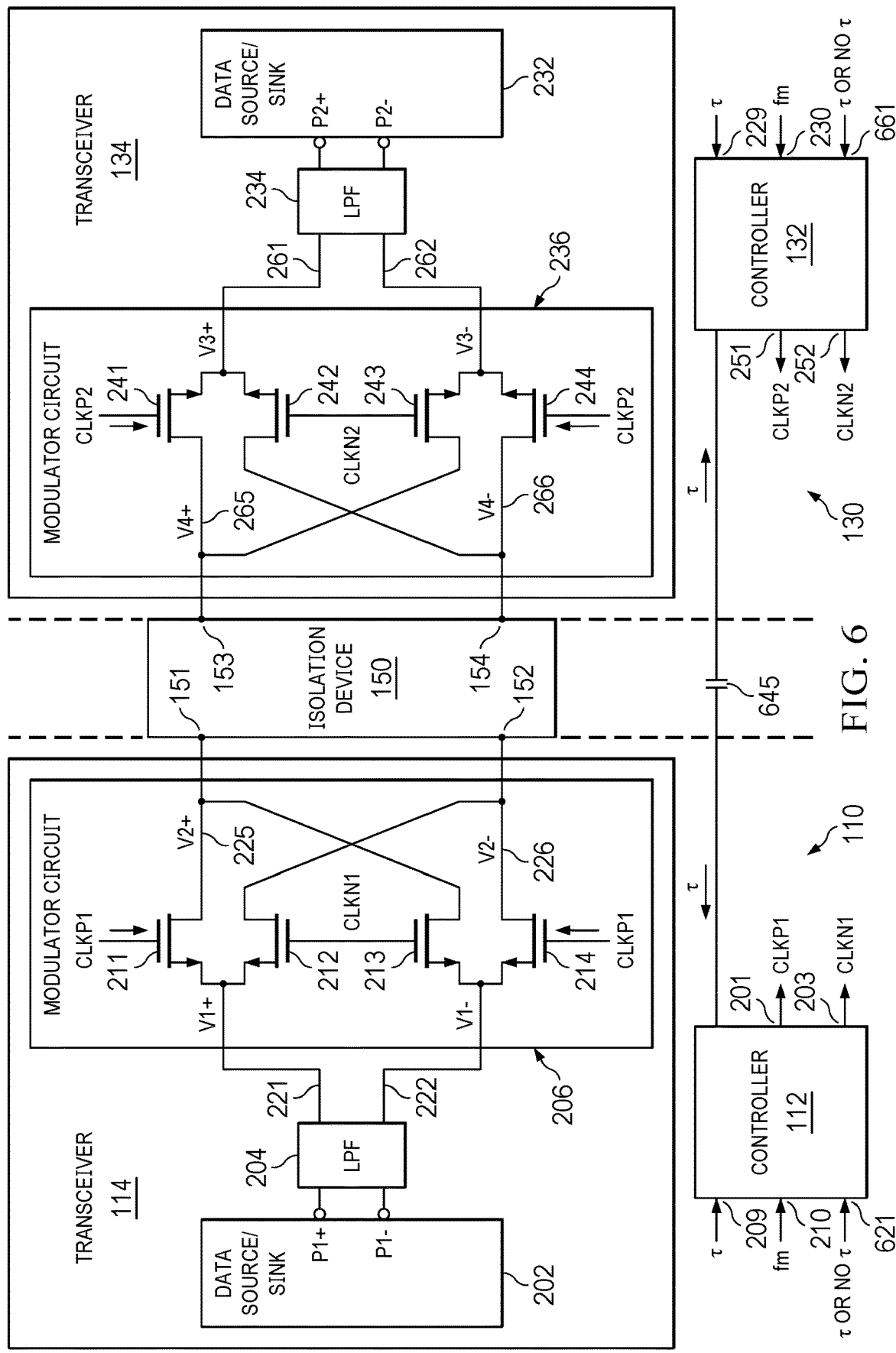

FIG. 6 is a schematic diagram of system 100 that is mostly the same as system 100 in FIG. 2. Controllers 112 and 132 in the example of FIG. 6 have a delay enable control input-delay enable control input 621 for controller 112 and delay enable control input 661 for controller 132. Each controller 112, 132 can be programmed to enable delay τ or not to enable delay τ. For example, a logic high on delay enable control input 621, 661 can program that controller to implement delay τ, and a logic low on the delay enable control can program the controller not implement delay τ. One of the controllers is programmed to implement delay τ, while the other controller is programmed not to implement delay τ.

FIG. 6 also illustrates that controllers 112 and 132 implement clock injection. The oscillation frequencies of controllers 112 and 132 can be at similar but not sufficiently close frequencies when they are uncoupled. A strong coupling through a galvanic isolation capacitor 645 allows controller 132 to capture the oscillation frequency of controller 112 and results in controller 132 to oscillate substantially at an identical frequency, allowing the controllers 112 and 132 to be synchronized.

Figure 7:
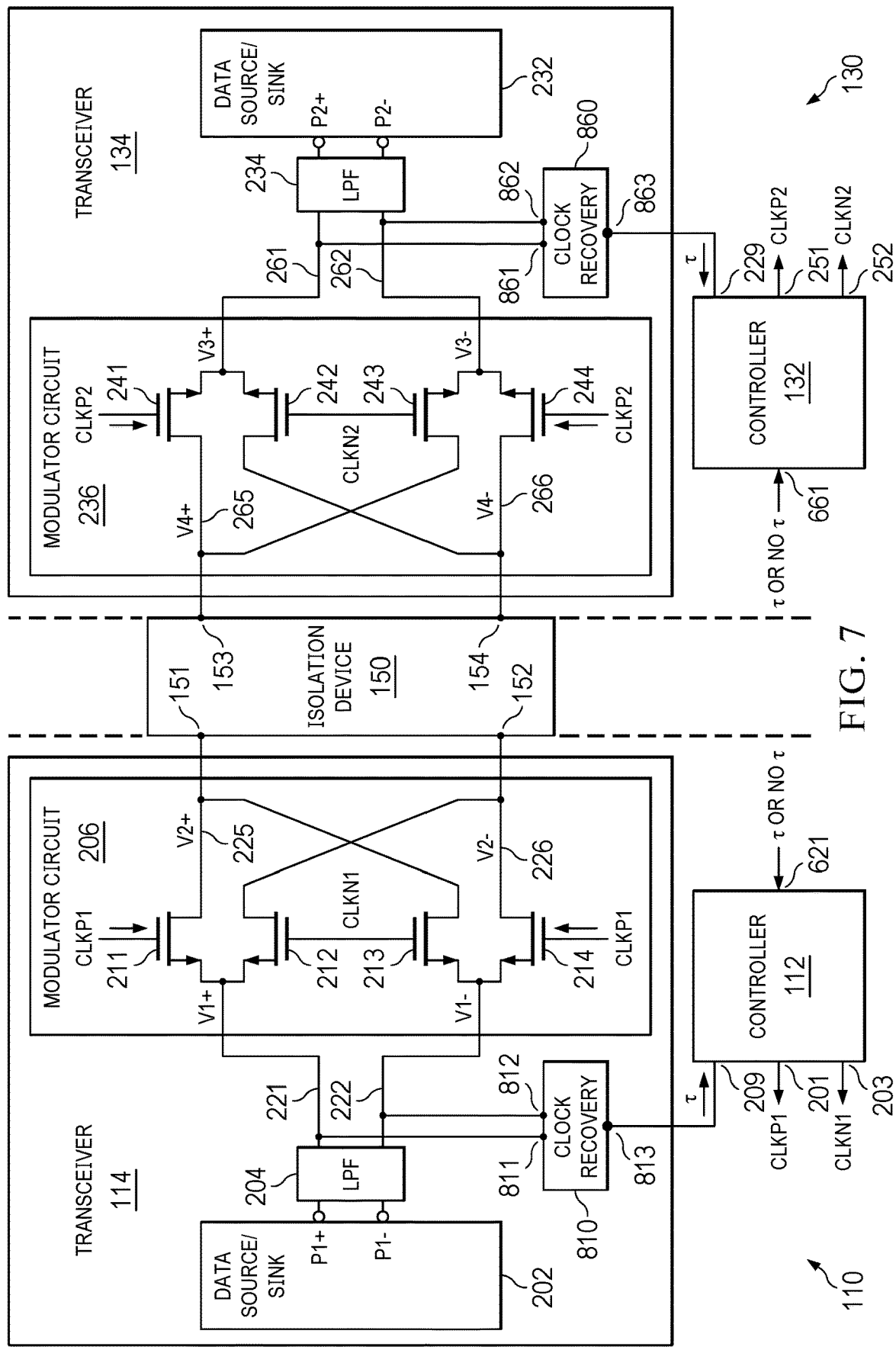

FIG. 7 is a schematic diagram of system 100 similar to that shown in FIG. 2 but with each transceiver having a clock recovery circuit. Transceiver 114 includes a clock recovery circuit 810, and transceiver 134 includes a clock recovery circuit 860. Clock recovery circuit 810 includes inputs 811 and 812 coupled to differential filter terminals 221 and 222, respectively. An output 813 of clock recovery circuit 810 is coupled to control input 209 of controller 112. Clock recovery circuit 810 recovers the frequency and phase of controller 112 to synchronize the clock of controller 132 to controller 112. A clock recovery loop can be implemented with a phase-locked-loop using non-data-aided or decision-directed carrier recovery techniques used in wireless communication systems. In addition to traditional carrier recovery approaches, a leaky carrier recovery as in U.S. Pat. No. 11,405,042, incorporated herein by reference, could be used. Similarly, clock recovery circuit 860 includes inputs 861 and 862 coupled to differential filter terminals 261 and 262, respectively. An output 863 of clock recovery circuit 860 is coupled to control input 229 of controller 132. Clock recovery circuit 880 also can recover a clock. An output 863 of clock recovery circuit 860 is coupled to control input 209 of controller 132.

Figure 8:
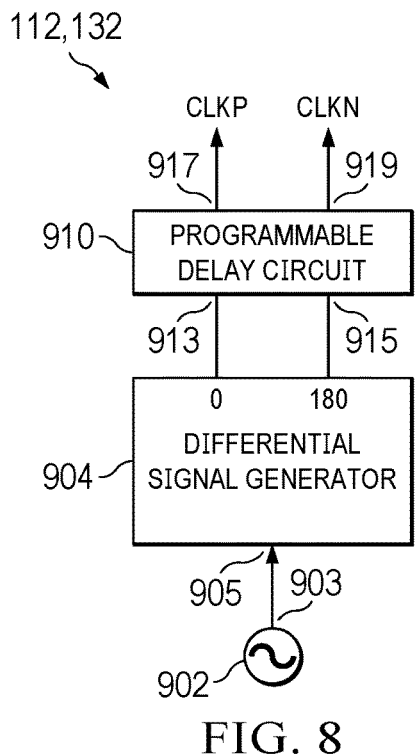

FIG. 8 is a schematic diagram of controllers 112 and 132. Each controller 112, 132 can include an oscillator 902, a differential signal generator 904, and a programmable delay circuit 910. An output 903 of oscillator 902 is coupled to an input 905 of the differential signal generator 904. The differential signal generator 904 generates differential output signals at the respective outputs 0 and 180, which are coupled to corresponding inputs 913, 915 of the programmable delay circuit 910. The programmable delay circuit 915 can generate the differential modulation signals CLKP/CLKN at its outputs 917 and 919. For controller 112, the outputs 917 and 919 of its programmable delay circuit 915 are (or are coupled to) the control outputs 201 and 203. For controller 132, the outputs 917 and 919 of its programmable delay circuit 915 are (or are coupled to) the control outputs 251 and 252.

The differential signal generator 904 receives an oscillation signal (e.g., a sinusoidal signal) from the oscillator 902 and converts the oscillation signal into differential square wave signals at its 0 and 180 outputs. The programmable delay circuit 910 can then add (or not add) the delay $\tau$ described above to generate the differential modulation signals CLKP/CLKN. The programmable delay circuit 910 is configured to implement a delay in accordance with the delay value provided at control input 209/229 or not to implement a delay if no delay value is provided at the control input.

Figure 9:
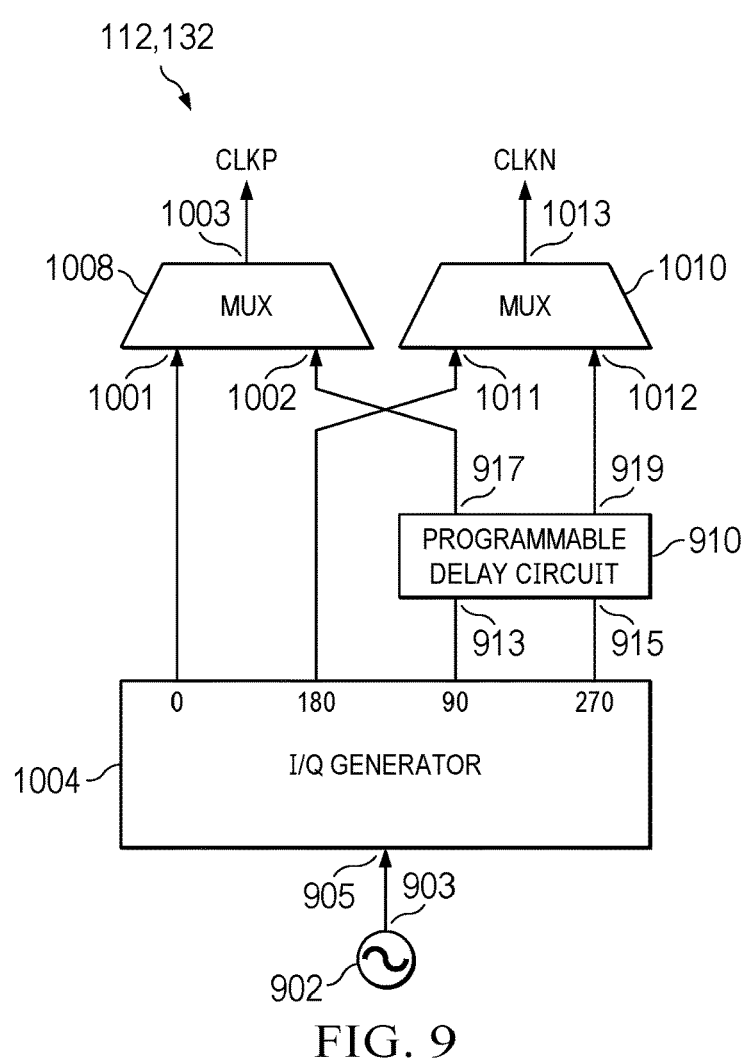

FIG. 9 is another schematic diagram of controllers 112 and 132. Each controller 112, 132 in this example can include oscillator 902, an I/Q generator 1004, the programmable delay circuit 910, and multiplexers 1008 and 1010. The output 903 of oscillator 902 is coupled to the input 905 of the differential signal generator 904. The I/Q generator 1003 generates four quadrature differential output signals at the respective outputs 0, 90, 180, and 270 outputs. Outputs 90 and 270 are coupled to inputs 913 and 915 of the programmable delay circuit 910. Multiplexer 1008 has inputs 1001 and 1002, a selection input 1005, and an output 1003. Multiplexer 1010 has inputs 1011 and 1012, a selection input 1015, and an output 1013. Selection input 1015 is inverted with respect to selection input 1005. The selection inputs 1005 and 1015 are coupled to control input 521/561. The 0 and 180 outputs of the I/Q generator 1004 are coupled to inputs 1001 and 1011, respectively, of multiplexers 1008 and 1010. The outputs 917 and 919 of the programmable delay circuit 910 are coupled to inputs 1002 and 1012, respectively, of multiplexers 1008 and 1010. The programmable delay circuit 910 can introduce the aforementioned delay $\tau$ for the modulation signals $m_{90}(t)$ and $m_{270}(t)$, as described above.

If the I/Q control input 521/561 is asserted to a first logic state (e.g., logic high), multiplexers 1008 and 1010 select their inputs 1001 and 1011 to produce the CLKP signal as $m_0(t)$ and the CLKN signal as $m_{180}(t)$. If the I/Q control input 521/561 is asserted to a second logic state (e.g., logic low), multiplexers 1008 and 1010 select their inputs 1001 and 1012 to produce the CLKP signal as $m_{90}(t)$ and the CLKN signal as $m_{270}(t)$, with or without delay $\tau$ based on the logic level of the control signal at control input 209/229.

Figure 10:
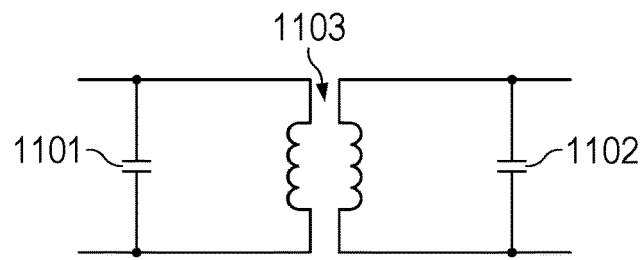
FIGS. 10, 11, 12, and 13 are schematic diagrams of an isolation device that can be part of the system of FIG. 1, in accordance with various examples.
Figure 11:
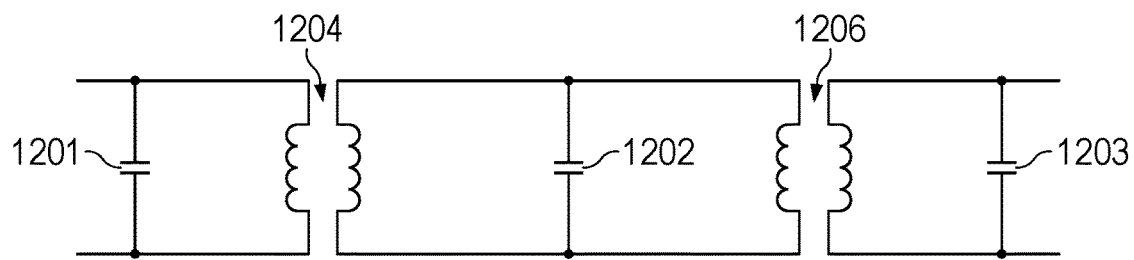
Figure 12:
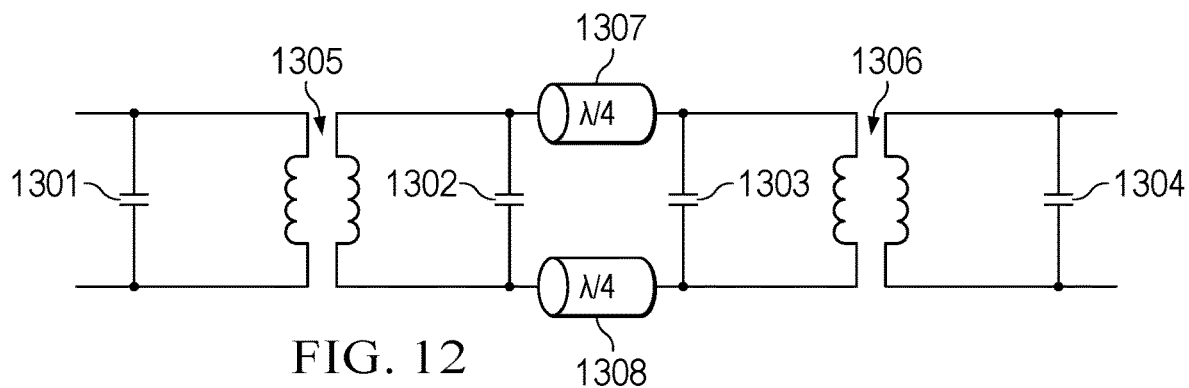

FIGS. 10-12 are schematic diagrams illustrating various examples of isolation device 150. Isolation device 150 in FIG. 10 includes capacitors 1101 and 1102 and a transformer 1103. Each capacitor 1101, 1102, is coupled across a respective winding of transformer 1103. Isolation device 150 in FIG. 10 can be a double tuned transformer.

FIG. 11 includes capacitors 1201, 1202, and 1203 and transformers 1204 and 1206. Capacitor 1201 is coupled across a winding of transformer 1204, and capacitor 1202 is coupled across the opposing winding of transformer 1204 as well as across a winding of transformer 1206. Capacitor 1203 is coupled across the opposing winding of transformer 1206. Isolation device 150 in FIG. 11 can be a cascaded double tuned transformer.

FIG. 12 includes capacitors 1301, 1302, 1303, and 1304, transformers 1305 and 1306, and transmission lines 1307 and 1308. Capacitor 1301 is coupled across a winding of transformer 1305, and capacitor 1302 is coupled across the opposing winding of transformer 1305. Capacitor 1303 is coupled across a winding of transformer 1306, and capacitor 1304 is coupled across the opposing winding of transformer 1306. Transmission line 1307 is coupled between the upper plates of capacitors 1302 and 1303, and transmission line 1308 is coupled between the lower plates of capacitors 1302 and 1303, as shown. Isolation device 150 in FIG. 12 can be a transmission line-coupled, double tuned transformer.

Figure 13:
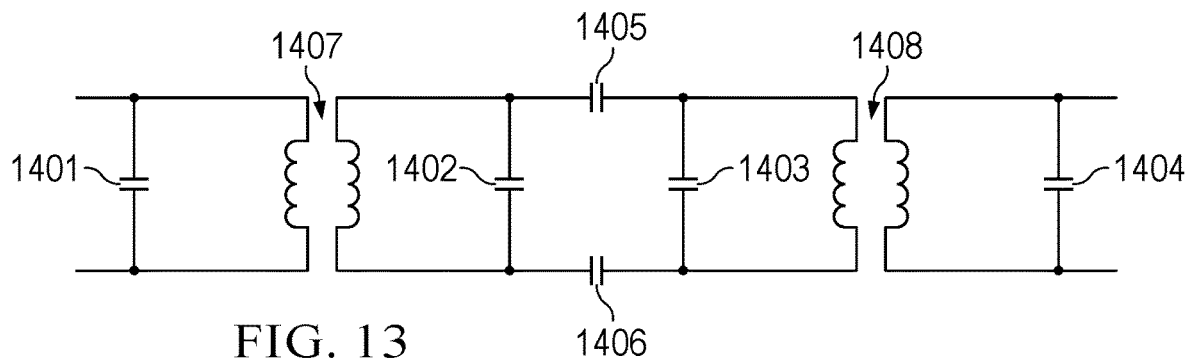

The isolation device 150 of FIG. 13 is similar to that of FIG. 12 but capacitors 1405 and 1406 are used instead of transmission lines 1307 and 1308. Isolation device 150 in FIG. 13 can be a capacitor-coupled, double tuned transformer.

Figure 14:
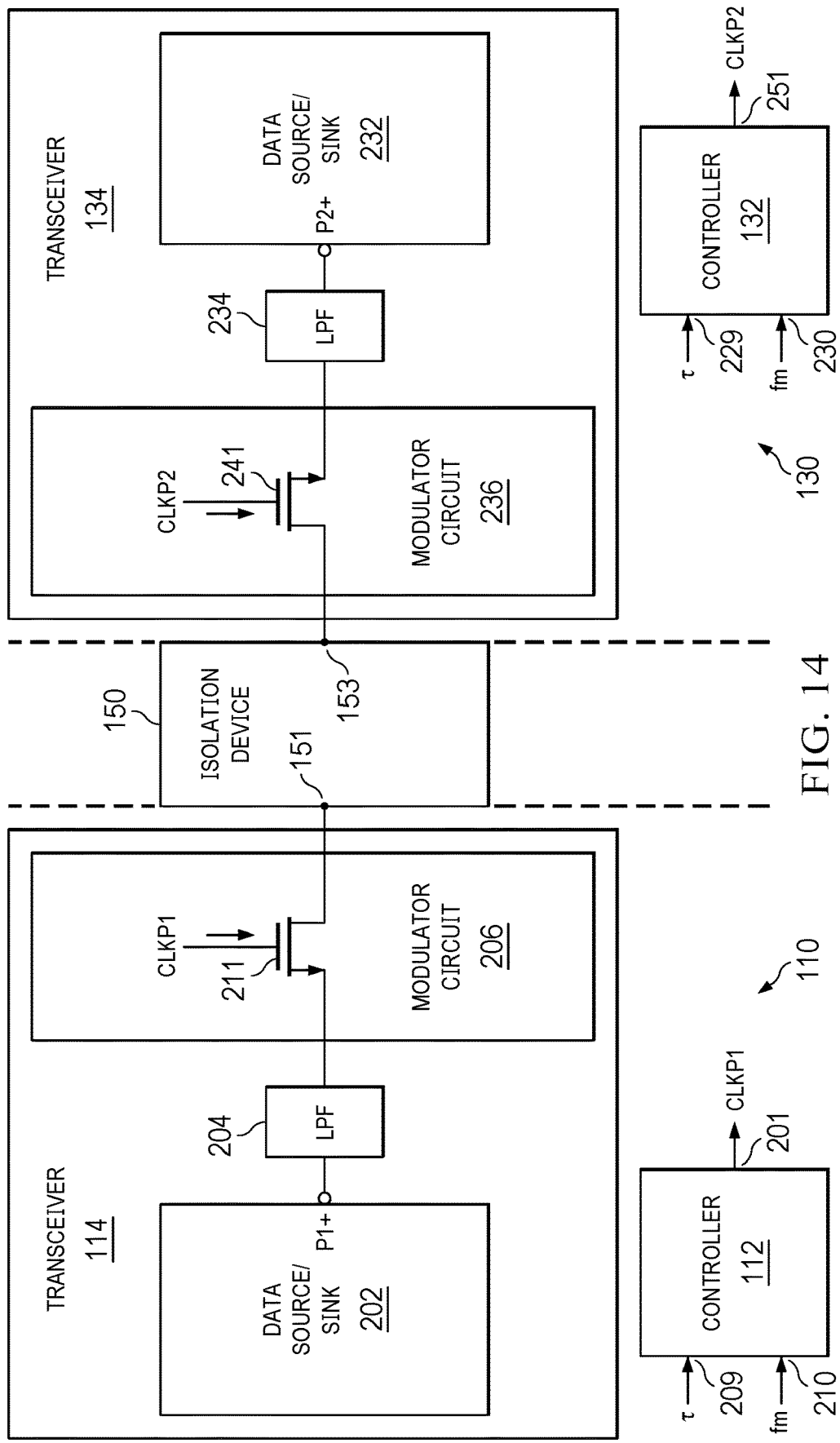
FIG. 14 is a schematic diagram of internal components of FIG. 1 to support bidirectional data communication over an isolation medium, in accordance with various examples.

FIG. 14 is a schematic diagram illustrating internal components of system 100 in accordance with various examples. In the example of FIG. 14, modulation circuit 206 can be a single-ended modulator circuit including transistor 211 controlled by modulation signal CLKP1, and modulation circuit 236 can be a single-ended modulator circuit including transistor 241 controlled by modulation signal CLKP2. Data source/sink 202 can provide or receive a single-ended signal P1+, and data source/sink 232 can provide or receive a single-ended signal P2+. Modulation circuit 206 can modulate the single-ended signal P1+ with modulation signal CLKP1, and modulation circuit 236 can modulate the single-ended signal P2+ with modulation signal CLKP2. Modulation signal CLKP1 can be provided by controller 112, and modulation signal CLKP2 can be provided by controller 132. The modulated signals can be transmitted over isolation device 150. Modulation circuit 206 can also modulate the modulated signal P2+ received from isolation device 150 with CLKP1, and process the modulated signal P2+ with LPF 204 to recover P2+. Modulation circuit 236 can also modulate the modulated signal P1+ received from isolation device 150 with CLKP2, and process the modulated signal P1+ with LPF 234 to recover P1+. As described above, modulation signals CLKP1 and CLKP2 can have a same frequency but phase-shifted with respect to each other to account the propagation delay through isolation device 150.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. An apparatus comprising:
a controller having differential modulation control outputs and including a programmable delay circuit, the controller configurable to provide differential modulation signals having a particular frequency at the differential modulation control outputs; and
a differential modulator circuit coupled between first differential terminals and second differential terminals, the differential modulator circuit having differential modulation control inputs coupled to the differential modulation control outputs, the differential modulator circuit configurable to:
modulate first differential signals at the first differential terminals with the differential modulation signals having the particular frequency;
provide the modulated first differential signals at the second differential terminals;
modulate second differential signals at the second differential terminals with the differential modulation signals having the particular frequency; and provide the modulated second differential signals at the first differential terminals.

2. The apparatus of claim 1, wherein the differential modulator circuit includes:
   a first transistor coupled between a first one of the first differential terminals and a first one of the second differential terminals, the first transistor having a first control terminal coupled to a first one of the differential modulation control inputs;
   a second transistor coupled between the first one of the first differential terminals and a second one of the second differential terminals, the second transistor having a second control terminal coupled to a second one of the differential modulation control inputs;
   a third transistor coupled between a second one of the first differential terminals and the first one of the second differential terminals, the third transistor having a third control terminal coupled to the second one of the differential modulation control inputs; and
   a fourth transistor coupled between the second one of the first differential terminals and the second one of the second differential terminals, the fourth transistor having a fourth control terminal coupled to the first one of the differential modulation control inputs.

3. The apparatus of claim 2, wherein the controller has first and second control inputs and includes:
   an oscillator having a frequency control input and an oscillator output, the frequency control input coupled to the first control input, the oscillator configurable to set the particular frequency responsive to a state of the first control input; and
   a modulation signal generator having a generator input and differential generator outputs, the generator input coupled to the oscillator output; and
   wherein the programmable delay circuit is coupled between the differential generator outputs and the differential modulation control outputs, the programmable delay circuit has a delay control input coupled to the second control input.

4. The apparatus of claim 2, wherein the programmable delay circuit has differential delay inputs, differential delay outputs, and a delay control input, wherein the controller has first, second, and third control inputs, the second control input coupled to the delay control input, and the controller includes:
   an oscillator having a frequency control input and an oscillator output, the frequency control input coupled to the first control input;
   a modulation signal generator having a generator input, in-phase differential generator outputs, and quadrature-phase differential generator outputs, the generator input coupled to the oscillator output, and the quadrature-phase differential generator outputs coupled to the differential delay inputs; and
   a first multiplexor circuit having a first multiplexor input, a second multiplexor input, a first multiplexor output, and a first selection input, the first multiplexor input coupled to a first one of the in-phase differential generator outputs, the second multiplexor input coupled to a first one of the differential delay outputs, the first multiplexor output coupled to the first one of the differential modulation control outputs, and the first selection input coupled to the third control input; and
   a second multiplexor circuit having a third multiplexor input, a fourth multiplexor input, a second multiplexor output, and a second selection input, the third multiplexor input coupled to a second one of the in-phase differential generator outputs, the fourth multiplexor input coupled to a second one of the differential delay outputs, the second multiplexor output coupled to the second one of the differential modulation control outputs, and the second selection input coupled to the third control input.

5. The apparatus of claim 1, further comprising a low pass filter coupled between the first differential terminals and the differential modulator circuit.

6. The apparatus of claim 1, wherein the controller has a control input, and the apparatus further comprises a clock recovery circuit coupled between the first differential terminals and the control input.

7. The apparatus of claim 1, wherein the differential modulator circuit is configurable to transmit the modulated first and second signals as full-duplex signals.

8. An apparatus comprising:
   a first controller having first differential modulation control outputs and including a programmable delay circuit, the first controller configurable to provide first differential modulation signals having a particular frequency at the first differential modulation control outputs;
   a first differential modulator circuit coupled between first differential terminals and second differential terminals, the first differential modulator circuit having first differential modulation control inputs coupled to the first differential modulation control outputs, and the first differential modulator circuit configurable to:
      modulate first differential signals at the first differential terminals with the first differential modulation signals having the particular frequency;
      provide the modulated first differential signals at the second differential terminals;
      modulate modulated second differential signals at the second differential terminals with the first differential modulation signals having the particular frequency to recover second differential signals; and
   provide the recovered second differential signals at the first differential terminals;
   a second controller having second differential modulation control outputs and configurable to provide second differential modulation signals having the particular frequency at the second differential modulation control outputs;
   a second differential modulator circuit coupled between third differential terminals and fourth differential terminals, the second differential modulator circuit having second differential modulation control inputs coupled to the second differential modulation control outputs, and the second differential modulator circuit configurable to:
      modulate the modulated first differential signals at the third differential terminals with the second differential modulation signals having the particular frequency to recover the first differential signals;
      provide the recovered first differential signals at the fourth differential terminals;
      modulate second differential signals at the fourth differential terminals with the second differential modulation signals having the particular frequency; and
      provide the modulated second differential signals at the third differential terminals.

9. The apparatus of claim 8, wherein the first programmable delay circuit is configurable to set a phase shift between the first and second differential modulation signals, in which the phase shift is based on a propagation delay between the second differential terminals and third differential terminals.

10. The apparatus of claim 9, wherein the first controller has a control input, and the second controller includes a control output coupled to the control input, and the first controller configurable to:
receive a control signal at the control input representing the second differential modulation signals; and
determine the phase shift based on the control signal.

11. The apparatus of claim 9, wherein the first controller has a control input, and the apparatus further comprises a clock recovery circuit having inputs and a clock recovery output, the inputs of the clock recovery circuit coupled to the first terminals, the clock recovery output coupled to the control input, and the first controller configurable to:
receive a control signal at the control input representing a phase relationship between the recovered second differential signals and the first differential modulation signals; and
determine the phase shift based on the control signal.

12. The apparatus of claim 8, wherein:
the first controller includes a first modulation signal generator having in-phase differential generator outputs coupled to the first differential modulation control outputs; and
the second controller includes a second modulation signal generator having quadrature-phase differential generator outputs coupled to the second differential modulation control outputs.

13. The apparatus of claim 8, wherein the first differential modulator circuit is configurable to transmit the modulated first differential signals and the recovered second differential signals as full-duplex signals; and
wherein the second differential modulator circuit is configurable to transmit the modulated second differential signals and the recovered first differential signals as full-duplex signals.

14. The apparatus of claim 8, further comprising an isolation device coupled between the second and third differential terminals.

15. The apparatus of claim 14, wherein:
the first controller and the first differential modulator circuit have a first ground terminal;
the second controller and the second differential modulator circuit have a second ground terminal; and
the isolation device is configurable to isolate the first ground terminal from the second ground terminal.

16. The apparatus of claim 14, wherein:
the first controller and the first differential modulator circuit have a first power supply terminal;
the second controller and the second differential modulator circuit have a second power supply terminal; and
the isolation device is configurable to isolate the first power supply terminal from the second power supply terminal.

17. The apparatus of claim 14, wherein:
the first controller and the first differential modulator circuit are on a first semiconductor die;
the second controller and the second differential modulator circuit are on a second semiconductor die; and
the first and second dies are included within a same package.

18. The apparatus of claim 14, wherein the isolation device comprises a transformer having a primary winding coupled between the second differential terminals and a secondary winding coupled between the third differential terminals.

19. The apparatus of claim 14, wherein the isolation device comprises:
a first transformer having a first primary winding and a first secondary winding, the first primary winding coupled between the second differential terminals; and
a second transformer having a second primary winding and a second secondary winding, the second secondary winding coupled between the third differential terminals; and
wherein the first secondary winding is coupled to the second primary winding.

20. The apparatus of claim 19, wherein the first secondary winding is coupled to the second primary winding via a transmission line or a capacitor.

21. An apparatus comprising:
a controller having a modulation control output and including a programmable delay circuit, the controller configurable to provide a modulation signal having a particular frequency at the modulation control output; and
a modulator circuit coupled between a first terminal and a second terminal, the modulator circuit having a modulation control input coupled to the modulation control output, and the modulator circuit configurable to:
modulate a first signal at the first terminal with the modulation signal having the particular frequency;
provide the modulated first signal at the second terminal;
modulate a second signal at the second terminal with the modulation signal having the particular frequency; and
provide the modulated second signal at the first terminal.

* * * * *